Feb. 17, 1942.   J. D. LANGDON   2,273,118
CHECK VALVE AND AIR VENT
Filed Aug. 19, 1940
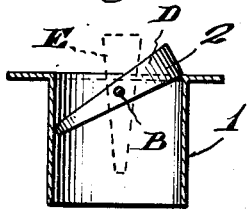
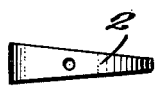
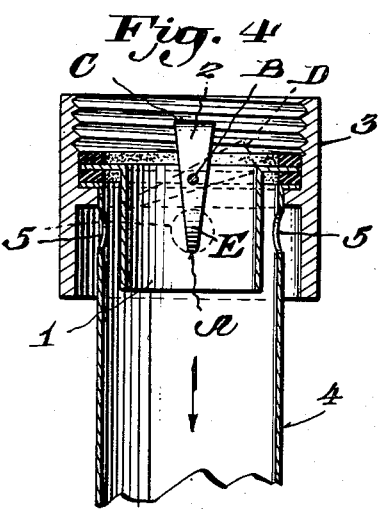
Inventor
Jesse D Langdon Patented Feb. 17, 1942

2,273,118

UNITED STATES PATENT OFFICE 2,273,118

CHECK VALVE AND AIR VENT

Jesse D. Langdon, Los Angeles, Calif.

Application August 19, 1940, Serial No. 353,286

3 Claims. (Cl. 137—69)

The present device relates to check valves and air vents particularly for use for the prevention of back siphonage between a supply line and a container where the supply line is liable to a condition of vacuum.

The primary object in the invention is to provide the combination of a simple check valve and an air inlet tube wherein the various elements comprising the device are cooperable to permit atmospheric air to enter the air inlet tube and act to close the check valve when a vacuum is created in the supply line.

Another object is to provide a check valve member swung in an aperture and capable of closing said aperture at such times as vacuum is created from the supply line side, remaining open under the influence of fluid pressure passing from the supply line and remaining normally in closed position during the time there is no activity of pressure or vacuum.

Other and further objects of the invention will appear as the specification proceeds, and it is specifically understood that the drawing illustrates only one form of reduction to practice, the structure may be changed to meet the contingencies of use within the scope of the claims.

Of the drawing:

Fig. 1 is a line diagram illustrating a flanged sleeve with a check valve in closed position, open position shown in dotted lines.

Fig. 2 is an edge view of the check valve member.

Fig. 3 is a plan of the check valve member.

Fig. 4 is a longitudinal section of an assembly including a coupling nut combined with a check valve, flanged sleeve and air vent tube.

The form of the invention shown consists of sleeve 1 having a wedge-shaped check valve member 2 pivotally disposed therein just below the flanged portion which sleeve is inserted in a skirted coupling nut 3, having a rubber sealing washer above and below the flange which rests upon the flanged upper end of an air vented flanged tube 4 which is in turn supported upon an inwardly disposed circumferential shelf within the nut 3 which has a depending skirt to cover air vents 5 disposed through tube 4.

The coupling nut 3 comprises the inlet side of the device while the flanged tube 4 comprises the outlet. When fluid is flowing from the supply side through the device the check valve is held vertical due to the fact that the distance between the edge A and the pivot B is greater than the distance between the pivot B and the heavy end C. When fluid ceases to flow the pivot being very loose in the hole bored transversely through the check valve 2, the end C being heavy enough to overcome the extra length of the check 2 between A and B, causes the valve to remain normally closed. When a vacuum is created from the supply side the valve portion between A and B offers a greater area to air entering through the air vent 5 than the remaining portion between B and C which holds the check valve 2 in closed position D. The open position of the valve is shown in dotted lines at E with the end C disposed upward.

Fig. 4 shows the provision of a coupling nut 3 serving as a cowling for the air vent 5 and a support for the entire assembly. However, it is deemed preferable to have no cowling or skirt disposed across the air vent 5 so that the condition of the air vent opening and the flanged sleeve can be seen at all times.

Having described my invention, the structure and operation thereof, I claim:

1. The combination of a coupling washer having disposed therein a flanged tube having air vents therethrough disposed above the level of the lower end of a flanged sleeve which is disposed within said flanged tube, an air inlet space being provided between said sleeve and said flanged tube, an unbalanced check valve mounted on a pivot just below the flanged end of said flanged sleeve, said check valve being substantially wedge-shaped and the pivot being disposed off center as between the thick and the thin ends of the wedge, the thick end of the wedge being disposed upwardly above the flanged end of said sleeve whereby said check valve will normally remain closed due to the heavier end of the wedge falling to one side of said pivot, said thin end resting against the inner wall of said sleeve and said heavy end of the wedge resting against the upper edge of the sleeve when the check valve is in closed position.

2. For use with a device of the kind described, a flanged sleeve having an unbalanced check valve member therein, said check valve being wedge-shaped and having the thick end of the wedge protruding above the flanged end of said sleeve said check valve member being centrally pivoted with relation to the internal diameter of the flanged sleeve whereby it is adapted to rotate in either direction from the open or vertical position to close the passage through the flanged sleeve.

3. An unbalanced check valve comprising a flanged tubular sleeve having inflow and outflow ends, an unbalanced valve member pivotally swung in the tubular portion of the sleeve and having a thickened portion extending from, and capable of closing the tube either side of the pivot toward the inflow and a thinner portion of greater area extending toward and capable of closing the outflow end either side of the pivot, that portion of the valve member extending from the pivot toward the inflow end having less effective area exposed to pressure exerted from the inflow side of the pivot than the thinner area of the valve member extending from the outflow side of the pivot, whereby pressure fluid flowing into the inflow end of the sleeve will cause the valve to open, and pressure fluid flowing into the outflow end of the sleeve will cause the valve to close, said valve being capable of falling laterally either side of said pivot to close said tube and adapted to remain normally closed when the inflow end of the sleeve is disposed upwardly.

JESSE D. LANGDON.